(12) United States Patent
Gates et al.

(10) Patent No.: US 10,409,634 B2
(45) Date of Patent: Sep. 10, 2019

(54) SURFACING TASK-RELATED APPLICATIONS IN A HETEROGENEOUS TAB ENVIRONMENT

(71) Applicant: Microsoft Technology Licensing, LLC, Redmond, WA (US)

(72) Inventors: Samuel George Gates, Seattle, WA (US); Ross N. Luengen, Sammamish, WA (US); Lee Dicks Clark, Seattle, WA (US); Richard Fang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 15/620,623

(22) Filed: Jun. 12, 2017

(65) Prior Publication Data
US 2018/0307525 A1 Oct. 25, 2018

Related U.S. Application Data

(60) Provisional application No. 62/487,373, filed on Apr. 19, 2017.

(51) Int. Cl.
| | |
|---|---|
| *G06F 3/0483* | (2013.01) |
| *G06F 9/54* | (2006.01) |
| *G06F 9/46* | (2006.01) |
| *G06F 3/0486* | (2013.01) |
| *G06F 8/61* | (2018.01) |
| *G06F 9/455* | (2018.01) |
| *G06F 9/451* | (2018.01) |
| *G06F 3/0482* | (2013.01) |

(52) U.S. Cl.
CPC ............ *G06F 9/461* (2013.01); *G06F 3/0483* (2013.01); *G06F 3/0486* (2013.01); *G06F 8/61* (2013.01); *G06F 9/451* (2018.02); *G06F 9/45512* (2013.01); *G06F 9/54* (2013.01); *G06F 9/542* (2013.01); *G06F 3/0482* (2013.01)

(58) Field of Classification Search
None
See application file for complete search history.

(56) References Cited

U.S. PATENT DOCUMENTS

| | | |
|---|---|---|
| 2009/0006981 A1 | 1/2009 | Pagan |
| 2009/0007004 A1 | 1/2009 | Holecek et al. |

(Continued)

OTHER PUBLICATIONS

"Sysadmins Keep An Eye On All Those Servers With Tidytabs", http://web.archive.org/web/20161014083146/http://www.nurgo-software.com/products/tidytabs, Published on: Oct. 14, 2016, 6 pages.

(Continued)

*Primary Examiner* — Isaac T Tecklu

(57) ABSTRACT

Techniques for surfacing task-related applications in a heterogeneous tab environment are described. In at least some implementations, a task group is created based on an implicit association between source content from a source application and target content from a target application based on a request to launch the target application from the source application. According to various implementations, the heterogeneous tab environment presents the task group and a trigger event is defined based on the task group. Detecting the trigger event causes surfacing of the task group in the tab environment.

20 Claims, 10 Drawing Sheets

(56) References Cited

U.S. PATENT DOCUMENTS

| | | | |
|---|---|---|---|
| 2011/0107266 A1 | 5/2011 | Hegde et al. | |
| 2013/0232429 A1 | 9/2013 | Fisher et al. | |
| 2014/0223356 A1 | 8/2014 | Sauve et al. | |
| 2014/0310728 A1 | 10/2014 | Fang et al. | |
| 2014/0358970 A1 | 12/2014 | Morris et al. | |
| 2016/0103793 A1 | 4/2016 | Fang et al. | |
| 2016/0124595 A1* | 5/2016 | Kim | G06F 3/0482 715/769 |
| 2016/0203018 A1 | 7/2016 | Deluca et al. | |

OTHER PUBLICATIONS

"Creating Tabbed Applications", http://web.archive.org/web/20140602092146/http:/developer.xamarin.com/guides/ios/user_interface/creating_tabbed_applications/, Published on: Jun. 2, 2014, 32 pages.

"Launch Your Connected App from the Salesforce App Launcher", https://developer.salesforce.com/docs/atlas.en-us.identityImplGuide_meta/identityImplGuide/identity_quickstart_applauncher.htm, Published 2000, 3 pages.

"Automatically re-open windows, apps, and documents on your Mac", https://support.apple.com/en-us/HT204005, Published on: Oct. 10, 2016, 6 pages.

Dobie Alex, "Chrome For Android Stops Merging Apps And Tabs By Default", http://www.androidcentral.com/chrome-android-stops-merging-apps-and-tabs-default, Published on: Mar. 17, 2016, 13 pages.

"Why can't i open a link to a PDF in a new tab?", Retrieved From «https://support.mozilla.org/en-US/questions/1006147», Jun. 14, 2014, 4 Pages.

"The World's Stupidest Productivity Tip: Open All in Tabs", Retrieved From «https://engtech.wordpress.com/2008/08/29/productivity-tip-open-all-in-tabs», Aug. 29, 2008, 11 Pages.

"International Search Report and Written Opinion Issued in PCT Application No. PCT/US2017/048521", dated Jan. 19, 2018, 15 Pages.

"Is it possible to save a whole window of tabs for a later date (not just for next time)?", Retrieved From «https://support.mozilla.org/en-US/questions/941808», Nov. 13, 2012, 3 Pages.

\* cited by examiner

SURFACING TASK-RELATED APPLICATIONS IN A HETEROGENEOUS TAB ENVIRONMENT

RELATED APPLICATION

This application claims priority under 35 U.S.C. Section 119(e) to U.S. Provisional Patent Application No. 62/487,373, filed Apr. 19, 2017 and titled "Resurfacing Task-Related Applications in a Heterogeneous Tab Environment," the entire disclosure of which is hereby incorporated by reference herein.

BACKGROUND

Conventionally, users who seek to resume a task that requires to access to more than one application are required to individually open each item in each application. For example, a user reading e-mail in an e-mail application opens an attachment and the attachment launches in an image viewing application. At a later time, the user wishes to resume a task involving the e-mail and attachment and must launch each application again. Enabling surfacing of heterogeneous content generally requires explicit user setup, such as via a custom script.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for surfacing task-related applications in a heterogeneous tab environment are described. In at least some implementations, a task group is created based on an implicit association between content launched to a target application from a source application. According to various implementations, a tab environment is launched presenting both the source application and the target application. Thus, receiving a trigger event causes subsequent surfacing of the task group in the tab environment for interaction with the heterogeneous content in a single shell interface.

DETAILED DESCRIPTION

Implementations discussed herein enable surfacing task-related applications in a heterogeneous tab environment. The described techniques, for instance, enable creating and surfacing a task group in a tab environment. In an example implementation, a client device presents a source application with source content that includes a visual indicator selectable to launch target content in a target application. A user selects the visual indicator, such as a document attachment, from the source application and a request is generated. The request causes a heterogeneous tab environment to be presented including a tab populated by the source application and a tab populated by the target application. A task group is then created to include the source content and the target content based on an association between the source content and the target content indicated by the request. To enable the task group to be recreated, a trigger event is defined for surfacing the task group in a heterogeneous tab environment. The trigger event may be defined in various ways, such as an indication of a request to launch the target content or the source content.

In some instances, the user opens additional relevant content in the tab environment while the source content and/or the target content are presented. As a result, the task group is updated to include the additional relevant content and the trigger event is updated based on the additional relevant content. When the trigger event is subsequently detected, the task group is surfaced in the heterogeneous tab environment. For instance, consider that after the heterogeneous tab environment is closed, the user selects the target content for presentation. This fires the trigger event, which causes a heterogeneous tab environment to be presented ("surfaced") with the task group. Thus, content from disparate sources is associated as a task group to enable the content to be surfaced in a tab environment at a later time.

Generally, surfacing a task group in a heterogeneous tab environment allows for interaction with associated content from heterogeneous sources in a single shell interface. Thus, techniques described herein simplify interactions with associated content by providing a user with associated content from a task group of heterogeneous sources in a single, intuitive shell and without requiring the user to remember and individually launch each instance of the associated content in the task group.

Having presented an overview of techniques for surfacing task-related applications in a heterogeneous tab environment, consider now an example environment in which techniques described herein may be implemented.

Figure 1:
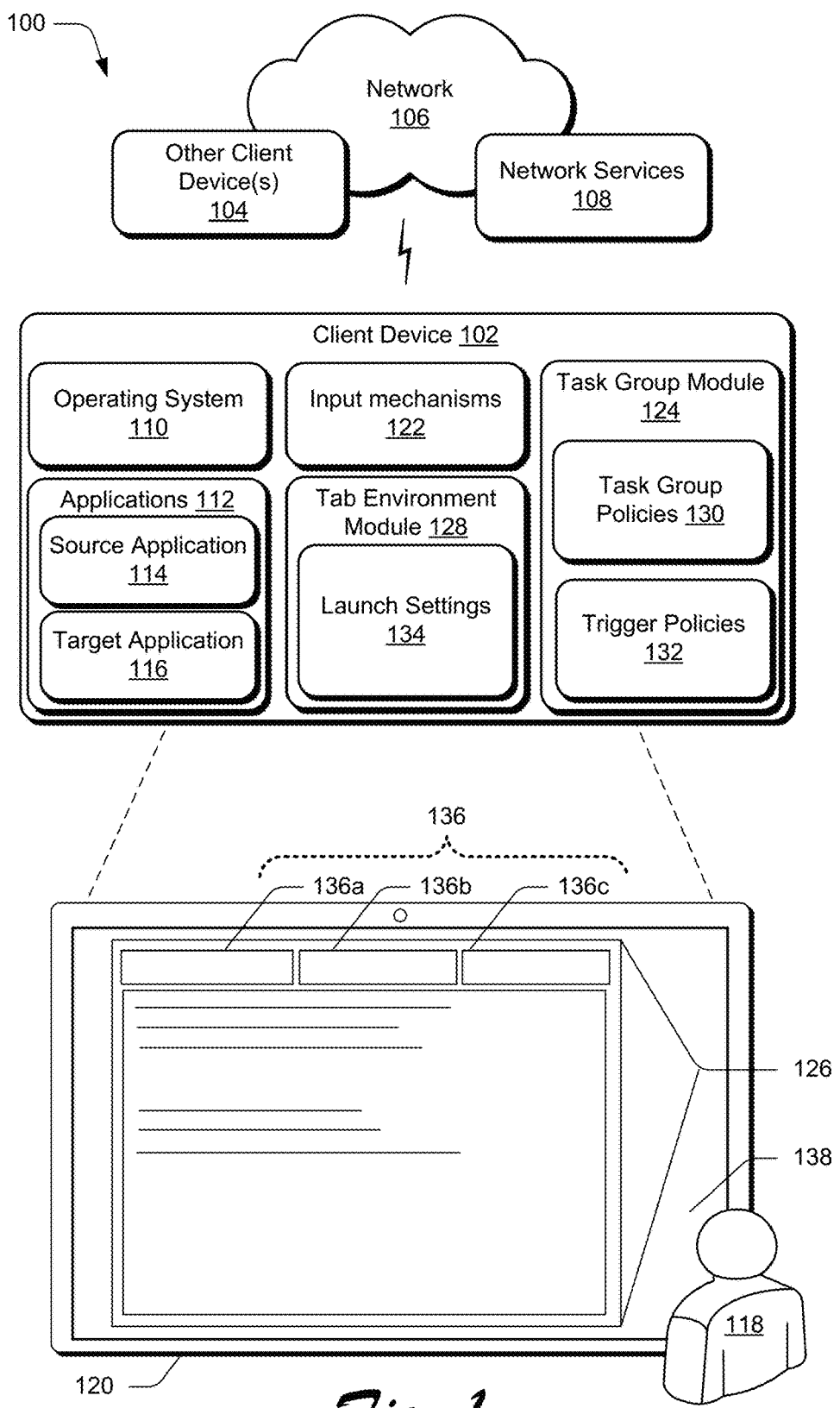
FIG. 1 is an illustration of an environment in an example implementation that is operable to employ techniques discussed herein.

FIG. 1 is an illustration of an environment 100 in an example implementation that is operable to employ techniques for surfacing task-related applications in a heterogeneous tab environment discussed herein. Environment 100 includes a client device 102, which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. Additionally, although a single computing device is shown in some instances, the client device 102 may be representative of a plurality of different devices, such as other client device(s) 104 capable of communicating over a network 106. The other client device(s) 104, which can be embodied as any suitable device, are generally representative of a plurality of different devices capable of communicating with the client device 102 over the network 106. One of a variety of different examples of the client device 102 and/or the other client device(s) 104 is shown and described below in FIG. 9.

The network 106 is representative of a network that provides the client device 102 with connectivity to various networks and/or services, such as the Internet. The network 106 may provide the client device 102 with connectivity via a variety of different connectivity technologies, such as broadband cable, digital subscriber line (DSL), wireless cellular, wireless data connectivity (e.g., WiFi™) T-carrier (e.g., T1), Ethernet, and so forth. In at least some implementations, the network 106 represents different interconnected wired and wireless networks. The network 106 may be implemented in various ways, such as a local access network (LAN), a wide area network (WAN), the Internet, and so forth. According to various implementations, the network 106 provides the client device 102 with access to network services 108.

The network services 108 are generally representative of a network-based functionality for providing data and services to the client device 102 over the network 106. The data and services provided by the network services 108 can include any suitable combination of data and/or services typically made available over a network such as the network 106. Some examples of services include, but are not limited to, an online computing service (e.g., "cloud" computing), an authentication service, web-based applications, a file storage and collaboration service, a search service, messaging services such as email, text and/or instant messaging, a social networking service, and so forth. Services provided by the network services 108 may also include location information services, which can determine a location of the client device 102, based on an identity of a network and/or network component with which the client device 102 is in communication. Examples of location information include global positioning system (GPS) coordinates, street addresses, network location, location with reference to cell towers and/or cellular base stations, and so forth.

The client device 102 includes a variety of different functionalities that enable various activities and tasks to be performed. For instance, the client device 102 includes an operating system 110 and applications 112. Generally, the operating system 110 is representative of functionality for abstracting various system components of the client device 102, such as hardware, kernel-level modules and services, and so forth. The operating system 110, for instance, can abstract various components of the client device 102 to the applications 112 to enable interaction between the components and the applications 112.

The applications 112 represent functionalities for performing different tasks via the client device 102. Examples of the applications 112 include a word processing application, a spreadsheet application, a web browser, a gaming application, and so forth. The applications 112 may be installed locally on the client device 102 to be executed via a local runtime environment, and/or may represent portals to remote functionality, such as cloud-based services, web apps, and so forth. Thus, the applications 112 may take a variety of forms, such as locally-executed code, portals to remotely hosted services, and so forth.

The applications 112 include a source application 114 and a target application 116. The source application 114 generally represents an application with which a user 118 may interact to view and manipulate content in various ways. In at least some implementations, some of the content presented by the source application 114 opens via a different application, e.g., the target application 116. The target application 116, for example, represents an application, which launches as a result of interaction with content in the source application 114.

The client device 102 further includes a display device 120 and input mechanisms 122. The display device 120 generally represents functionality for visual output for the client device 102. Additionally, the display device 120 represents functionality for receiving various types of input, such as touch input, pen input, and so forth.

The input mechanisms 122 represent different functionalities for receiving input to the client device 102. Examples of the input mechanisms 122 include touch input devices, touchless input devices, gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 122 may be separate or integral with the display device 120; integral examples include gesture-sensitive displays with integrated touch-sensitive or motion-sensitive sensors.

The client device 102 further includes a task group module 124, which is representative of functionality to perform various actions pertaining to creating, maintaining, and surfacing task groups discussed herein. The task group module 124, for instance, can be leveraged to create and maintain groups of heterogeneous content accessed by the user 118 to enable the user 118 to surface the content in a convenient and intuitive manner, such as in a heterogeneous tab environment ("tab environment") 126. For example, the task group module 124 associates concurrently active content as a task group to enable surfacing the heterogeneous content in a convenient interface. Various attributes and operational aspects of the task group module 124 are detailed below.

In implementations, the task group module 124 can manage, control, and/or interact with the operating system 110 and/or a tab environment module 128 of the client device 102 to enable the techniques for creating, maintaining, and surfacing task groups described herein. The task group module 124, for example, may provide selective modification to a user experience ("UX") based on task groups in the tab environment 126.

The task group module 124 maintains task group policies 130, which are representative of different sets of data that specify criteria (e.g., permissions, rules, and so forth) for collecting, aggregating, maintaining, and/or presenting task-related content for the user 118. The task group module 124, for instance, causes the tab environment module 128 to present task group content in the tab environment 126 based on the content collected and aggregated in accordance with the task group policies 130. Thus, the task group policies 130 can be leveraged to specify which content to collect, aggregate, and/or present, as well as how to configure content for presentation. Alternatively or additionally, the task group policies 130 are content and/or application-specific. Further, the task group policies 130 may specify privacy settings for the user 118 regarding collection and/or aggregation of content accessed by the user 118. Generally, the task group policies 130 can be configured in various ways such as via default settings, settings specified by a user, by information technology (IT) personnel, by application development personnel, and so forth.

The task group module 124 further maintains trigger event policies ("trigger policies") 132, which are representative of different sets of data that specify criteria (e.g., permissions, rules, and so forth) for surfacing task-related content for the user 118. The trigger policies 132, for instance, specify which input, occurrence, behavior, event, and so forth causes the task group module 124 to surface the task-related content for the user 118. In at least some implementations, the trigger policies 132 are content and/or application-specific. For instance, the trigger policies 132 may specify contextual data related to the task and/or the user 118 to include for identifying a trigger event. Examples of the contextual data include date, time, location, device type, and so forth.

By including the contextual data related to the task and/or the user 118 for identifying the trigger event, the task group module 124 is able to surface task-related content to the user 118 in appropriate and relevant circumstances. The trigger policies 132 may specify that the task group module 124 obtain data from the network services 108 over the network 106 to identify and/or detect a trigger event. For instance, consider an example implementation where the task group module 124 identifies that a trigger event occurs upon detecting that the user 118 is at the closest airport. To enable the task group module to detect the location of the user 118, the trigger policies 132 specify that data indicating the geographical location of the client device 102 be obtained from the network services 108 over the network 106. Generally, the trigger policies 132 can be configured in various ways such as via default settings, settings specified by a user, by information technology (IT) personnel, by application development personnel, and so forth.

The tab environment module 128 is representative of functionality for presenting the tab environment 126 and is capable of integrating content from heterogeneous sources into a single interactive shell interface. Generally, content may take a variety of forms, such as various combinations of the applications 112, services, text, multi-media streams, documents, application files, photos, audio/video files, animations, images, web pages, web applications, content for display by a browser or other client application, data structures, self-executing content, local content, remote content, application interfaces for the applications 112, and so forth. As used herein, heterogeneous content may refer to any combination of the various types and/or forms of content listed above including content of the source application 114, the target application 116, and/or other examples of the applications 112. While the tab environment module 128 is described herein as presenting the tab environment 126 in a single shell interface, it should be understood that the tab environment module 128 is capable of presenting the tab environment 126 in multiple separate shell interfaces as may be appropriate and/or convenient.

The tab environment module 128 maintains application launch settings ("launch settings") 134, which are representative of different sets of data that specify criteria (e.g., permissions, rules, and so forth) for managing launch and execution of the applications 112 in the tab environment 126. Generally, the launch settings 134 enable the applications 112 to be presented in the tab environment 126 without sacrificing aesthetic or functional aspects of native interfaces for the applications 112. The launch settings 134, for instance, indicate different behaviors that can be applied to different launch scenarios for the applications 112. Examples of the different behaviors applied to the applications 112 include adding, switching, positioning, sizing, and manipulating tabs 136 in the tab environment 126 and/or visual interfaces of the applications 112. Further, the launch settings 134 can enforce behaviors for the applications 112 based a particular device type and/or execution platform on which the applications 112 are launched. Alternatively or additionally, the launch settings 134 are content and/or application-specific.

In at least some implementations, the tab environment module 128 generates the tab environment 126 to enable the user 118 to interact with tabbed instances of heterogeneous content, including one or more of the applications 112. The tab environment 126 generally represents a functional collection of interaction affordances that can be configured in various ways according to techniques for a heterogeneous tab environment described herein. The tab environment 126 can be useful in a variety of settings, such as where the user 118 interacts with content from heterogeneous sources. In at least some implementations, the tab environment 126 may be implemented as a desktop, virtual or otherwise, and include various controls via interactive elements, menus, and so forth.

As depicted in the environment 100, the tab environment 126 includes tabs 136, which include a tab 136a, a tab 136b, and a tab 136c. Further, the tabs 136 are presented within a graphical user interface ("GUI") 138 that is output on the display device 120 by the tab environment module 128 to employ heterogeneous tab environment techniques described herein. Each of the tabs 136 can present different instances and/or types of content, thus affording interaction with heterogeneous content in a convenient manner, such as in a single shell interface. For instance, the tabs 136 can be populated by the source application 114 and/or the target application 116, as well as with content of the source application 114, target application 116, and/or the applications 112, and so forth. Generally, the tabs 136 represent individual shell interface frames presented within a single visual shell of the GUI 138 to enable quick and easy access to varied content via visual and selectable tabs in the shell, e.g., the tabs 136. While three of the tabs 136 are depicted, it should be understood that more or less than three of the tabs 136 may be presented in the tab environment 126.

By configuring the GUI 138 in the various ways described herein, the tab environment module 128 enables the user 118 to interact with content from heterogeneous sources through a single interface shell or multiple shell interfaces. According to various implementations, the GUI 138 can be implemented by the tab environment module 128 and can be made available to different devices associated with the user 118, such as the client device 102 and the other client device(s) 104. Regardless of where the GUI 138 is used, the GUI 138 is generally representative of a location to promote quick and easy interaction with heterogeneous content.

In this environment, the user 118 represents a single user associated with the tab environment 126, but it will be appreciated that more than one user may interact with the tab environment 126 and/or the GUI 138.

Having described an example environment in which the techniques described herein may operate, consider now a discussion of some example implementation scenarios in accordance with one or more embodiments. The implementation scenarios may be implemented in the environment 100 discussed above, and/or any other suitable environment.

Figure 2:
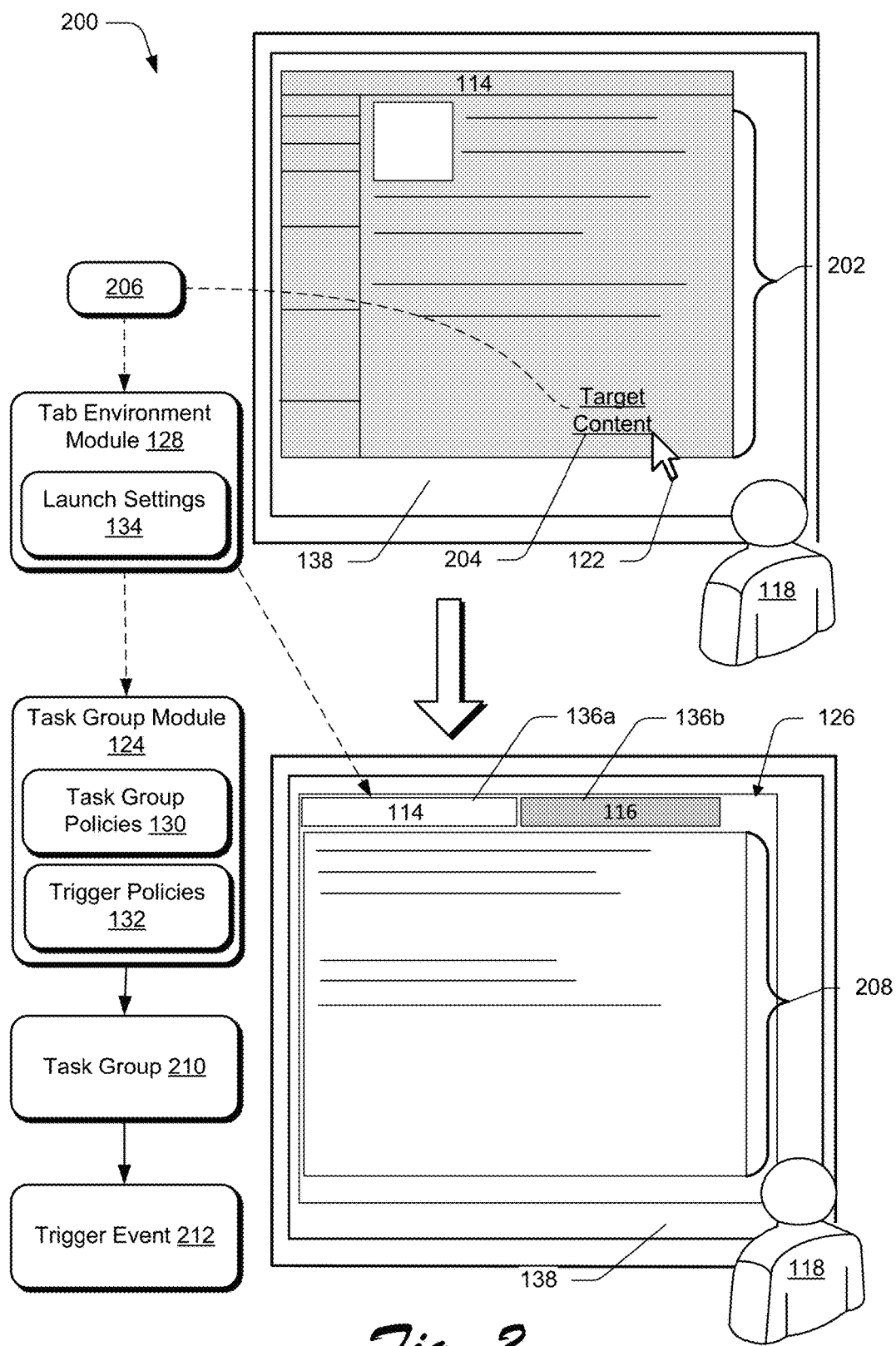
FIG. 2 depicts an example implementation scenario for creating a task group and launching a heterogeneous tab environment in accordance with one or more embodiments.

FIG. 2 depicts an example implementation scenario 200 for creating a task group and launching a heterogeneous tab environment in accordance with one or more implementations. The scenario 200 includes various entities and components introduced above with reference to the environment 100.

In the scenario 200, the user 118 interacts with source content 202 of the source application 114 presented on the GUI 138. The source content 202 includes a visual indicator 204 which is selectable from the source application 114 to launch the target application 116. The visual indicator 204, for instance, is representative of selectable functionality for invoking the target application 116. For example, the visual indicator 204 may represent an access protocol, e.g., a uniform resource locator (URL) or uniform resource indicator (URI). Additionally or alternatively, the visual indicator 204 may represent a launch protocol, e.g., a file type, application launch protocol, a selectable icon, and so forth.

Further to the scenario 200, the user 118 selects the visual indicator 204, which causes the source application 114 to generate a request 206. In at least some implementations, the selection of the visual indicator 204 is received via the input mechanisms 122. For instance, the user 118 selects the visual indicator 204 via a touch input, e.g., the input mechanisms 122.

The tab environment module 128 receives the request 206 from the source application 114 to launch the target application 116. Accordingly, and proceeding to the lower portion of the scenario 200, the tab environment module 128 causes the target application 116 to launch with target content 208. The request 206 generally includes various information pertaining to the target content 208, such as an identifier, a file type, an application launch protocol, and so forth.

To present the target content 208, the tab environment module 128 presents the tab environment 126 with the tab 136a and the tab 136b in the GUI 138, as depicted in the lower portion of scenario 200. In some implementations, the launch settings 134 specify that the tab environment module 128 present the tab environment 126 in the shell interface of the source application 114. In an alternative implementation, the tab environment module 128 presents the tab environment 126 in a new shell interface, replacing the shell interface of the source application 114.

In the scenario 200, the tab environment module 128 populates the tabs 136a and 136b with the source application 114 and the target application 116, respectively. The tab environment 126, for instance, is populated according to the launch settings 134 to display the target content 208 in the tab 136b. Generally, the tabs 136a, 136b are individually selectable to switch visual focus between the source content 202 and the target content 208. For instance, selecting the tab 136a causes the source content 202 to be presented in the foreground, and selecting the tab 136b causes the target content 208 to be presented in the foreground, such as to replace the source content 202 in the GUI 138.

Continuing with the scenario 200, the task group module 124 receives the request 206 and creates a task group 210 in response to receiving the request 206. The task group 210 generally represents heterogeneous content (e.g., the source content 202 and the target content 208) associated with each other by the task group module 124 as a result of interaction of the user 118 with the source content 202. In the scenario 200, the task group 210 is created to include the source content 202 and the target content 208 based on the task group module 124 receiving the request 206. Thus, the task group 210 enables heterogeneous content, e.g., the source content 202 and the target content 208, to be associated in a task-related manner based on receiving the request 206 to open content from a heterogeneous source, such as the request 206 to open the target application 116 from the source application 114. Alternatively or additionally, the task group 210 is created in response to an explicit request from the user 118 to create the task group 210.

Based on the task group 210, the task group module 124 defines a trigger event 212 in accordance with the trigger policies 132 for surfacing the task group 210. Generally, the trigger event 212 specifies one or more events that trigger the task group module 124 to surface the task group 210 to the tab environment module 128 for presentation in the tab environment 126. In accordance with the trigger policies 132, the task group module 124 can utilize various types of data for defining the trigger event 212, such as the source content 202, the target content 208, time-based events, location tracking, device type, input type, and so forth. According to various implementations, the task group module 124 defines the trigger event 212 to include detecting a request to launch the source content 202 and/or the target content 208. For instance, and as detailed below, the task group module 124 defines the trigger event 212 to include receiving an input at a URI configured to launch the target content 208 in the target application 116. By defining the trigger event 212 to include a request to present content from the task group 210, the task group module 124 is able to surface the task group 210 for the user 118 in a relevant context.

Figure 3:
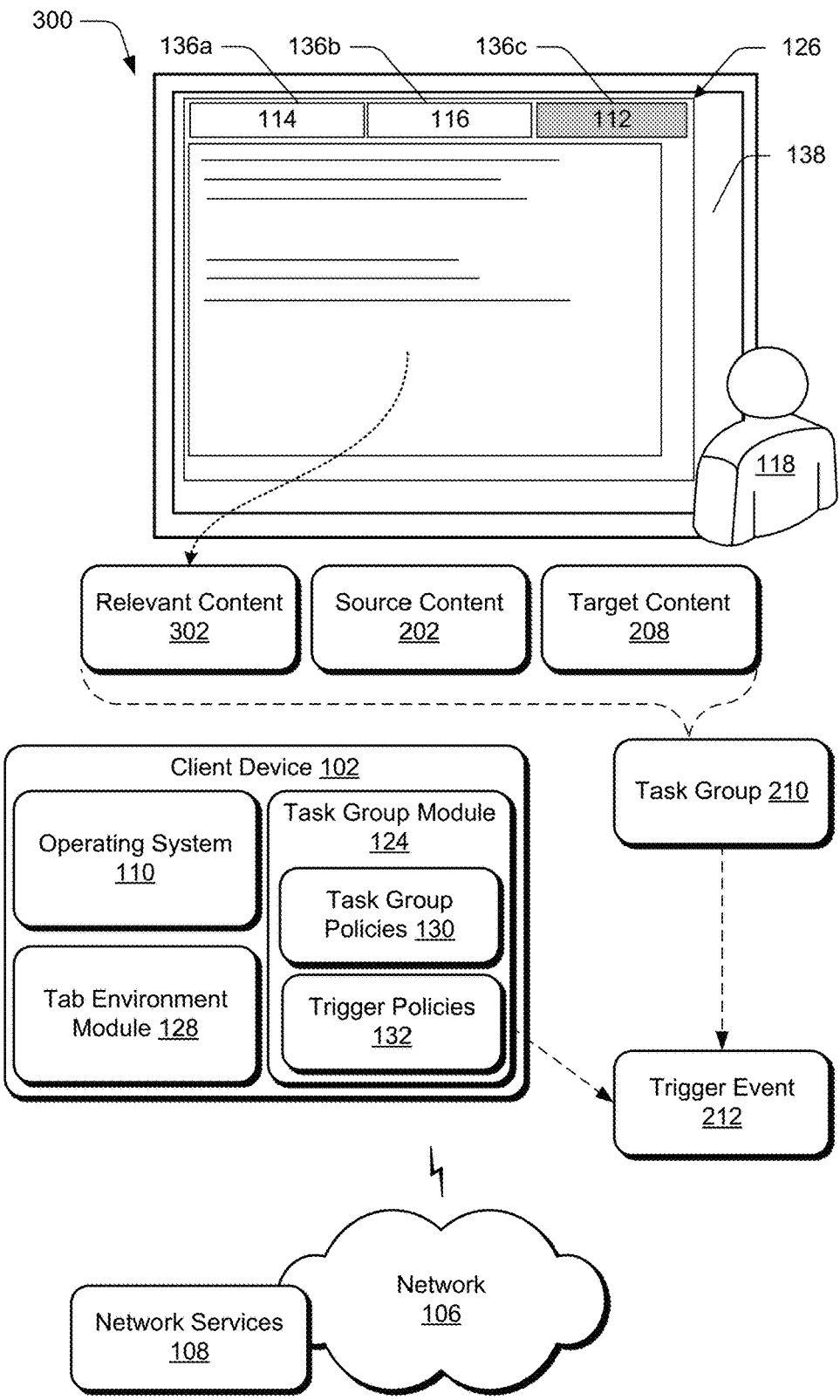
FIG. 3 depicts an example implementation scenario for updating a task group in accordance with one or more embodiments.

FIG. 3 depicts an example implementation scenario 300 for updating a task group in accordance with one or more implementations. The scenario 300 includes various entities and components introduced above with reference to the environment 100 and the scenario 200, and in at least some implementations represents an extension of the scenario 200.

In the scenario 300, the tab environment 126 is presented including the tab 136a populated by the source application 114, the tab 136b populated by the target application 116, and the tab 136c populated by additional relevant content 302. The relevant content 302 generally represents content, which is presented while with the tab 136a is populated with the source content 202 and/or the tab 136b is populated with the target content 208. In at least some implementations, the user 118 opens the relevant content 302 in the tab 136c while the tabs 136a and/or 136b are populated by the source content 202 and/or the target content 208, respectively.

For instance, consider an example where the source application 114 is a tax preparation application populating the tab 136a and the user 118 opens a web browser application (e.g., another instance of the applications 112) in the tab 136c to interact with the relevant content 302, in this case a tax form. The task group module 124 updates the task group 210 to include the relevant content 302 populating the tab 136c. For example, the task group module 124 sends a query to the tab environment module 128 and the tab environment module 128 identifies the relevant content 302. Continuing with the example scenario, the task group 210 is updated to include the relevant content 302, i.e., the tax form opened by the user 118 in the tab 136c. Thus, the tax form (e.g., the relevant content 302) is associated with the tax preparation application (e.g., the source content 202) by the task group module 124 based on both the relevant content 302 and the source content 202 being concurrently presented in the tab environment 126.

According to at least some implementations, the task group 210 is updated in response to the task group module 124 receiving an indication that the source content 202 and the target content 208 are no longer presented in the tab environment 126. To update the task group 210, the task group module 124 queries the tab environment module 128 for the relevant content 302. For example, the tab 136a populated by the source application 114 and the tab 136b populated by the target application 116 are both closed and the task group module 124 queries the tab environment module 128 for any content presented in the tab environment 126 with the source content 202 and/or the target content 208, e.g., the relevant content 302. The source content 202 and the target content 208 may cease to be presented in the tab environment 126 for various reasons. Examples of such reasons include closing of the tabs 136a and/or 136b by the user 118, closing of the tabs 136a and/or 136b by the tab environment module 128, closing of the tab environment 126 by the user 118, closing of the tab environment 126 by the tab environment module 128, closing of the tab environment 126 by the operating system 110, and so forth. In an alternative implementation, the task group module 124 queries the tab environment module 128 for the relevant content 302 responsive to receiving an indication that the tab 136c is populated while the source content 202 and/or the target content 208 populate the tab environment 126.

In response to updating the task group 210, the task group module 124 updates the trigger event 212 to account for the updated task group 210. For instance, the trigger event 212 is updated to include receiving a request to launch the relevant content 302 as an additional instance of the trigger event 212.

While the relevant content 302 is depicted as content of an application 112 populated to the tab 136c, it should be understood that any number of the tabs 136 of the tab environment 126 may be populated with the relevant content 302. The relevant content 302 may include the applications 112 or any other type of content presentable in the tab environment 126. In some implementations, the relevant content 302 may be a different instance of the source application 114 or the target application 116.

Figure 4A:
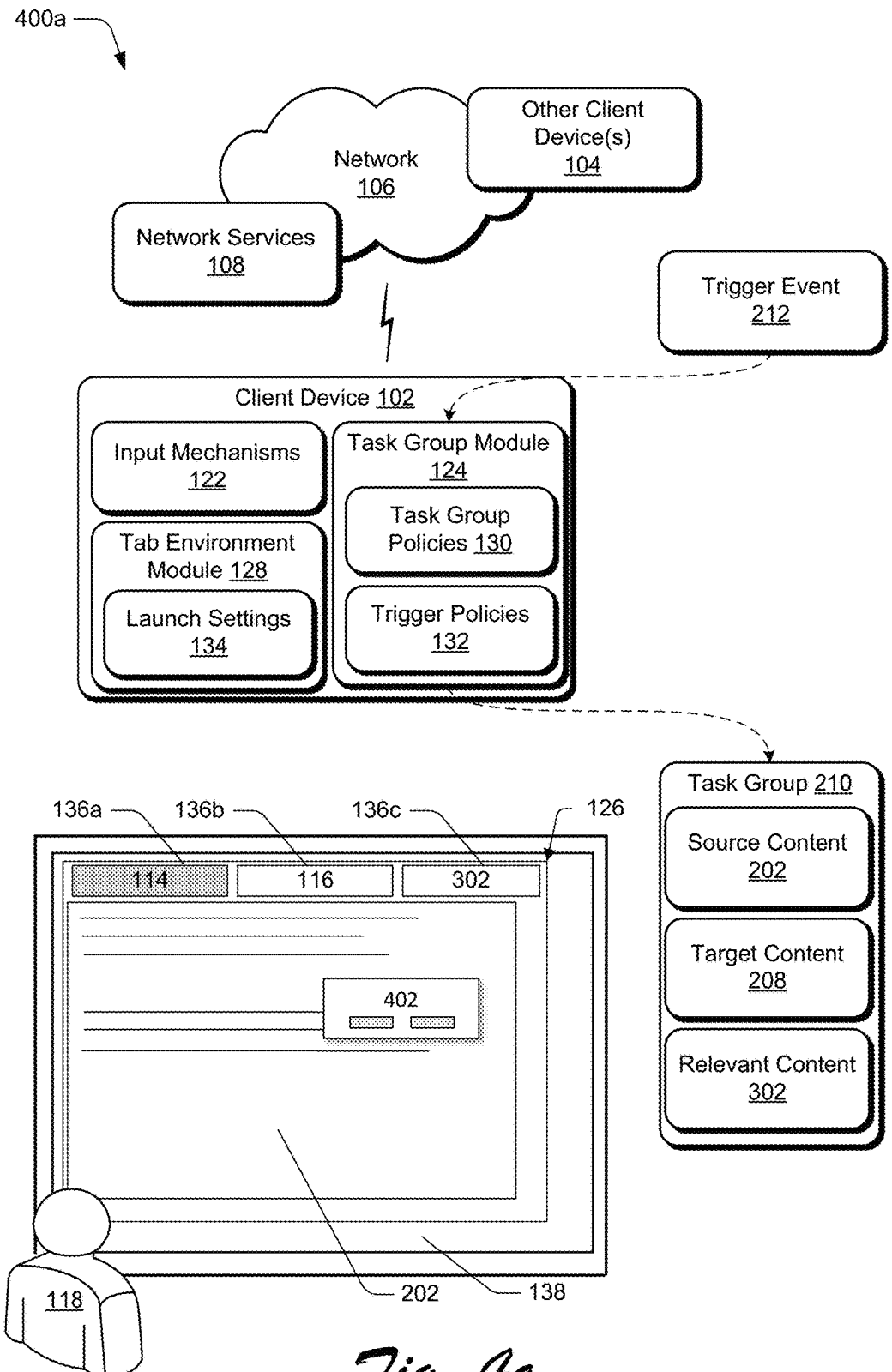
FIG. 4a depicts an example implementation scenario for surfacing a task group in a heterogeneous tab environment in accordance with one or more embodiments.

FIG. 4a depicts an example implementation scenario 400a for surfacing a task group in a heterogeneous tab environment in accordance with one or more implementations. The scenario 400a includes various entities and components introduced above with reference to the environment 100 and the scenarios 200, 300, and in at least some implementations represents an extension of the scenarios 200, 300.

In the scenario 400a, the task group module 124 receives an indication of the trigger event 212 and surfaces the task group 210 to the tab environment module 128 in response. The trigger event 212, for example, is received by the task group module 124 as a result of the user 118 selecting the target content 208 for presentation. Responsive to receiving the trigger event 212, the task group module 124 sends the task group 210 to the tab environment module 128 for presentation.

Consider an example where the task group 210 includes the relevant content 302, the source content 202, and the target content 208, all of which are related to tax preparation activities. In accordance with the task group policies 130, the task group module 124 determines that the task group 210 relates to tax preparation, such as based on keyword recognition within the task group 210. Continuing the example, the task group module 124 defines the trigger event 212 to include a time-based event such as a calendar date one week prior to a tax filing deadline for the user 118, and specifying that the task group module 124 is to obtain calendar and/or date information from the network services 108 in order to enable detection of the trigger event 212. As a result, the trigger event 212 occurs on the date specified by the task group module 124, e.g., one week before the tax filing deadline. The occurrence of the date specified by the trigger event 212 causes the task group module 124 to detect the trigger event 212. In response to detecting the trigger event 212, the task group module 124 surfaces the tax preparation-related content of the task group 210 to the tab environment module 128 for presentation to the user 118 in the tab environment 126. In scenarios such as the example described, the task group module 124 uses the trigger event 212 to define whether and/or when to surface the task group 210. In this manner, the trigger event 212 enables the user 118 to access a relevant group of tabs in a single shell interface, e.g., the tab environment 126, based on a relevant context for the user 118.

Continuing with the scenario 400a, the tab environment module 128 receives the task group 210 from the task group module 124 and presents the task group 210 in the tab environment 126. For instance, the tabs 136a, 136b, and 136c of the tab environment 126 are populated by the source application 114, the target application 116, and the relevant content 302, respectively. In at least some implementations, a visual prompt 402 is presented to the user 118 by the task group module 124 and/or the tab environment module 128 in response to the task group module detecting the trigger event 212. Generally, the visual prompt 402 is selectable to cause presentation of all or part of the task group 210 in the tab environment 126. For instance, the visual prompt 402 may be presented as an interactive control configured to display selectable representations of each instance of the source content 202, the target content 208, and the relevant content 302 as individually selectable and selectable as a group for presentation in the tab environment 126.

According to various implementations, the task group 210 is presented in a new instance of the tab environment 126. For instance, the task group module 124 created the task group 210 in association with a first instance of the tab environment 126 which was later closed, and the task group 210 is surfaced in a new instance of the tab environment 126. In at least some implementations, the trigger event 212 is detected over the network 106 and/or at other devices. For example, the trigger event 212 is detected by the task group module 124 from the other client device(s) 104 as a result of the user 118 selecting the source content 202 for presentation on the other client device(s) 104. Accordingly, the task group 210 is presented in a new instance of the tab environment 126 and on a different device, e.g., on an instance of the other client device(s) 104.

In at least one implementation, an application 112 to be populated to the tab environment 126 is not immediately available for execution and/or presentation in the tab environment 126. For example, the target application 116 is not installed on the client device 102. Accordingly, the tab environment module 128 may cause download and/or installation of the target application 116, such as from the network services 108 over the network 106. In some implementations, download and/or installation of content to enable presentation of the task group 210 may occur automatically in response to the trigger event 212 and/or in response to surfacing the task group 210. Additionally and alternatively, download and/or installation of content may occur responsive to explicit permission from the user 118 such as via a prompt, e.g., the visual prompt 402.

While the tab environment 126 is described above as a single shell interface, it should be understood that in at least some implementations the task group 210 is surfaced in more than one shell interface of the tab environment 126, such as in the scenario 400*b* described below.

Figure 4B:
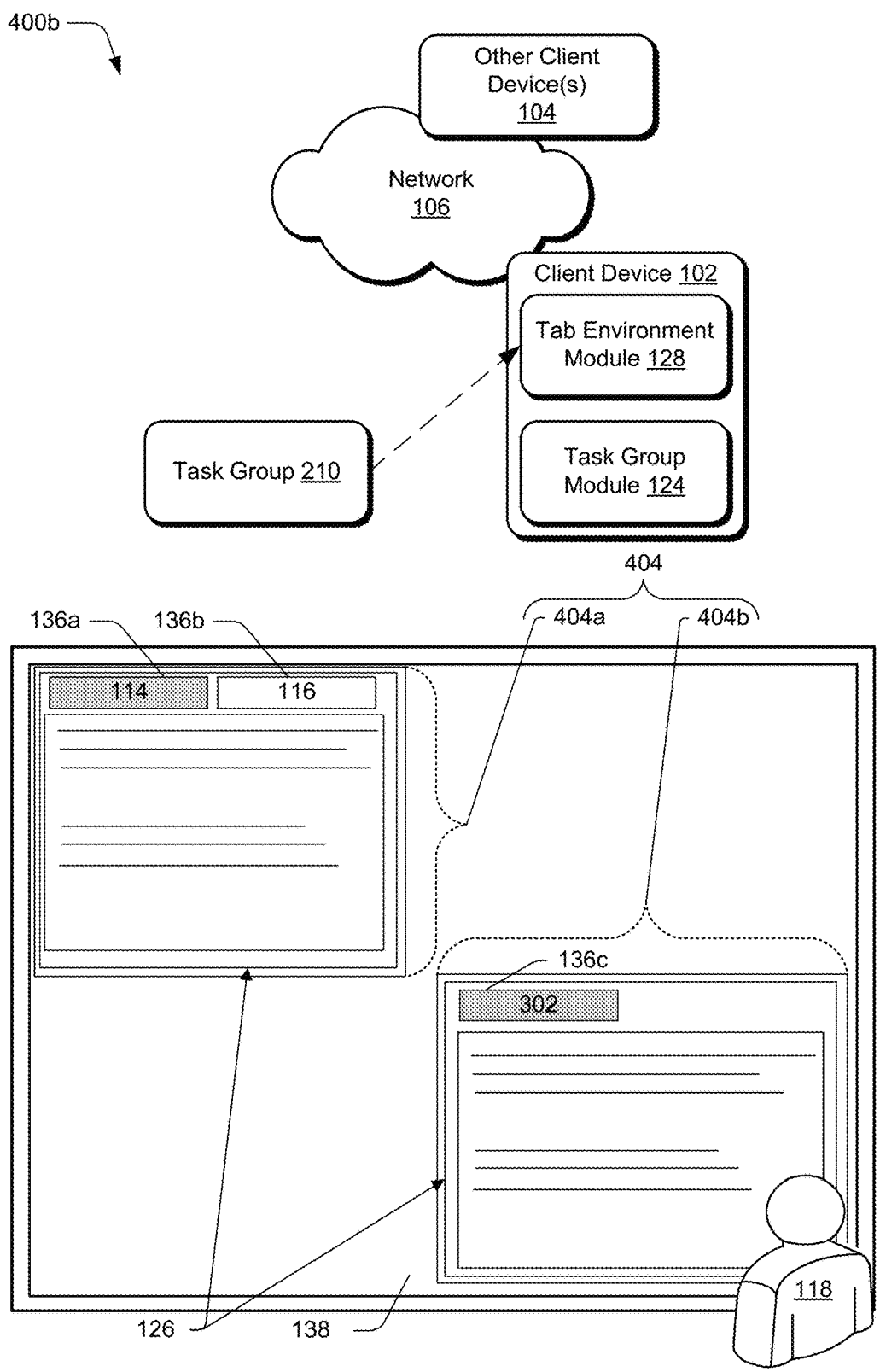
FIG. 4b depicts an example implementation scenario for surfacing a task group in more than one instance of a heterogeneous tab environment in accordance with one or more embodiments.

FIG. 4*b* depicts an example implementation scenario 400*b* for surfacing a task group in more than one instance of a heterogeneous tab environment in accordance with one or more implementations. The scenario 400*b* includes various entities and components introduced above with reference to the environment 100 and the scenarios 200, 300, 400*a*, and in at least some implementations represents an extension of and/or alternative to the scenarios 200, 300, and 400*a*.

In the scenario 400*b*, the tab environment module 128 receives the task group 210 from the task group module 124 and presents the task group 210 in the tab environment 126 as separate shell interfaces 404 of the tab environment 126, depicted in the scenario 400*b* as shell interface 404*a* and shell interface 404*b*. For example, a first portion of the tab environment 126 is presented in the shell interface 404*a* with the tabs 136*a* and 136*b* populated by the source application 114 and the target application 116, respectively. Further, a second portion of the tab environment 126 is presented in the shell interface 404*b* with the tab 136*c* populated by the relevant content 302. Generally, when the task group 210 is surfaced via the shell interfaces 404*a*, 404*b*, the shell interfaces 404*a*, 404*b* may be presented in a number of ways such as partially overlapping shell interfaces, side-by-side shell interfaces, shell interfaces on multiple display devices, and so forth.

According to various implementations, the tab environment 126 may be restored to a previous state by restoring characteristics of the tab environment 126, e.g., position, size, tab groups, user settings, device settings, and so forth. For instance, the previous state of the tab environment 126 and/or the task group 210 may include device-specific features such as a multi-display device configuration, a mobile configuration, and so forth. In order to restore the previous state of the tab environment 126, the tab environment module 128 and/or the task group module 124 may collapse more than one shell interface into a single shell interface with multiple tabs or expand one shell interface with multiple tabs into more than one shell interface in some implementations.

As illustrated in the scenario 400*b*, the tab environment 126 may be restored to a previous state to surface the task group 210 via the shell interfaces 404*a*, 404*b*. For example, consider a situation preceding the scenario 400*b* in which the tab environment 126 was presented on both the client device 102 and on a different device, e.g., on the other client device(s) 104. The scenario 400*b* depicts the task group 210 being surfaced to the tab environment 126 such that the tab environment 126 is restored to the previous state in which the task group 210 was presented across multiple devices. Since the task group 210 was previously presented on separate devices and in separate shell interfaces, the tab environment 126 is presented on the single client device 102 via the shell interfaces 404*a* and 404*b* to restore the previous state. Although the shell interfaces 404*a* and 404*b* were previously presented in the described situation across different devices as separate instances of the tab environment 126, the tab environment 126 is restored to the single client device 102, as shown in the scenario 400*b*. Thus, by surfacing the task group 210 into various configuration of the tab environment 126 via the shell interfaces 404, the task group module 124 causes presentation of the task group 210 in a convenient and intuitive manner across different device, display, and presentation configurations.

Figure 5:
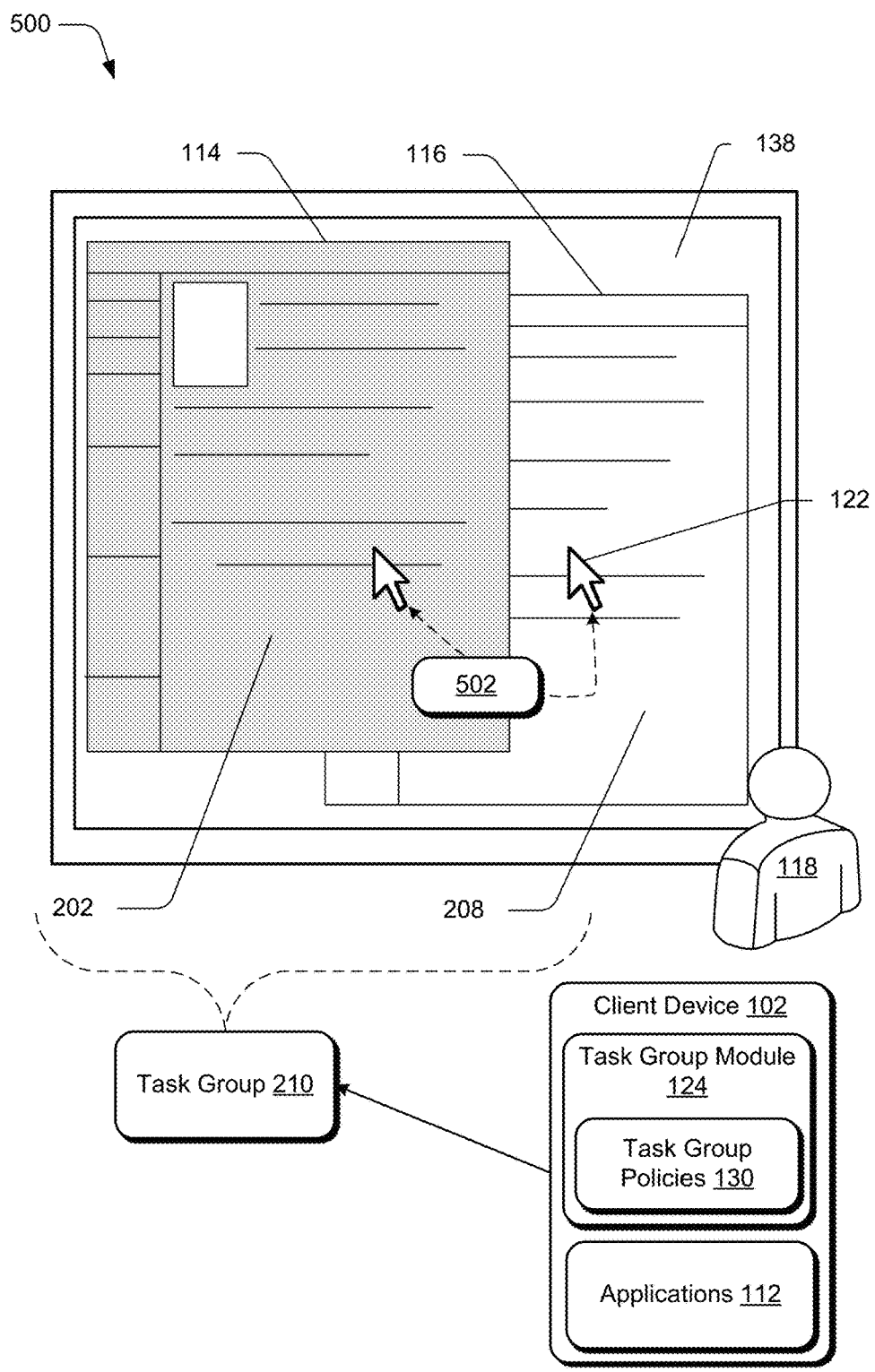
FIG. 5 depicts an example implementation scenario for creating a task group from task-related interaction in accordance with one or more embodiments.

FIG. 5 depicts an example implementation scenario 500 for creating a task group from task-related interaction in accordance with one or more implementations. The scenario 500 includes various entities and components introduced above with reference to the environment 100 and in at least some implementations represents an alternative to the scenario 200 or an extension of the scenarios 200, 300, 400*a*, and 400*b*.

In the scenario 500, the user 118 provides an input 502 to interact with the source content 202 of the source application 114 and the target content 208 of the target application 116. As depicted in the scenario, the source application 114 and the target application 116 are presented in separate shell interfaces on the GUI 138. The task group module 124 detects that interaction with the source content 202 and the target content 208 (e.g., heterogeneous content) includes the input 502 indicating that the interaction is task-related. Generally, the input 502 represents an input or pattern of inputs detected by the task group module 124 that indicate task-related interaction. In at least some implementations, the input 502 indicates task-related interaction based on frequency of occurrence and/or duration of the interaction with heterogeneous content such as the source content 202 and the target content 208. For instance, the input 502 is detected when the user 118 repeatedly switches focus between the source application 114 and the target application 116 in a task-related manner via the input mechanisms 122. The input 502 may indicate task-related interaction based on various attributes of the input 502, such as copy, cutting, or pasting between the source application 114 and the target application 116, switching a shell interface focus between the source application 114 and the target application 116, dragging a shell interface for an application 112 into the tab environment 126, and so forth.

In response to detecting the input 502 indicating the task-related interaction, the task group module 124 creates the task group 210 to include the source content 202 and the target content 208. Consider an example where the source application 114 is a word processing application and the target application 116 is a web browser application. Further, the user 118 is writing a paper in the source application 114 and researching the topic of the paper in the target application 116. Continuing the example, the user 118 repeatedly copies and pastes the target content 208 from the web browser (the target application 116) into the word processing document (the source content 202 of the source application 114). In this example, the copy and paste activity (e.g., interaction including the input 502) occurs for a predetermined number of occurrences and/or a predetermined duration and the task group module 124 determines the input 502 indicates task-related interaction and creates the task group 210 to include the source application 114 and the target application 116. In at least some implementations, the source application 114 and the target application 116 are presented via different display devices, such as in a multi-display configuration.

Having discussed some example implementation scenarios, consider now a discussion of some example procedures in accordance with one or more embodiments. The example procedures may be employed in the environment 100 of FIG. 1, the system 900 of FIG. 9 and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., at the client device 102), at a network-based service (e.g., at the network services 108), and/or via cooperation between the client device 102 and a network-based service.

Figure 6:
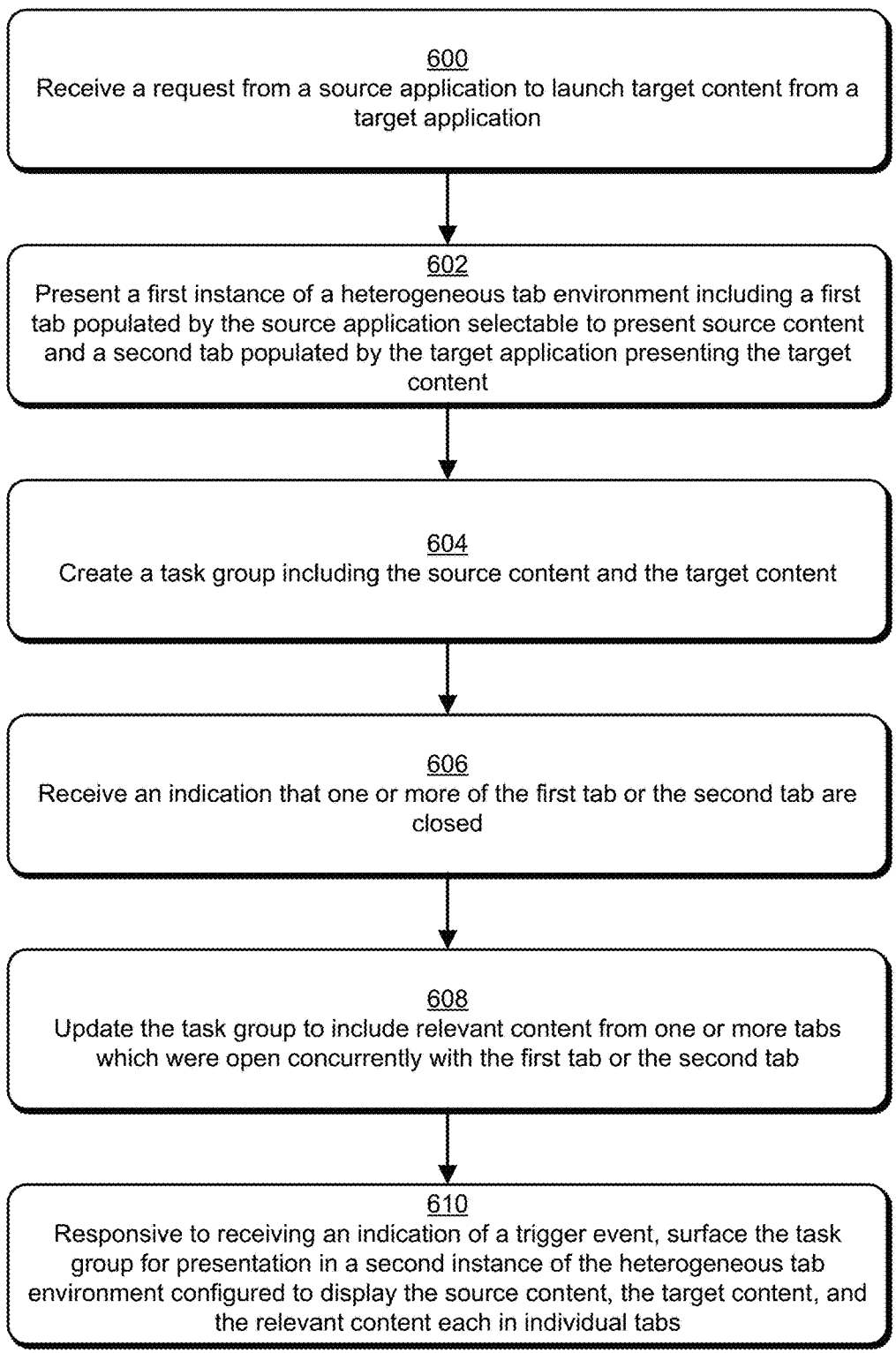
FIG. 6 is a flow diagram that describes steps in a method for creating and surfacing a task group in accordance with one or more embodiments.

FIG. 6 is a flow diagram that describes steps in a method for creating and surfacing a task group in accordance with one or more implementations. In at least some implementations, the method can be performed at least in part at the client device 102, e.g., by the task group module 124 and/or the tab environment module 128.

Step 600 receives a request from a source application to launch target content from a target application. The user 118, for instance, interacts with the client device 102 to perform an action to initiate launching the target content 208 from the source application 114. An example of such an action includes selecting the visual indicator 204 (e.g., an icon) via the input mechanisms 122.

Step 602 presents a first instance of a heterogeneous tab environment including a first tab populated by the source application selectable to present source content and a second tab populated by the target application presenting the target content. The tab environment 126, for instance, is presented in the GUI 138 by the tab environment module 128 in response to receiving the request 206. In various implementations, the tab environment 126 includes the tab 136a populated with the source application 114 and selectable to display the source content 202, and the tab 136b is populated with the target application 116 displaying the target content 208.

Step 604 creates a task group including the source content and the target content. The task group module 124, for example, creates the task group 210 to include the source content 202 and the target content 208 in response to receiving the request 206.

Step 606 receives an indication that one or more of the first tab or the second tab are closed. For example, the tab environment module 128 notifies the task group module 124 that the tab environment 126 was closed by the user 118. In at least some implementations, the tabs 136a and/or 136b were closed individually and at different times. Additionally or alternatively, the tabs 136a and/or 136b were closed as a result of the tab environment 126 being closed.

Step 608 updates the task group to include relevant content from one or more tabs which were open concurrently with the first tab or the second tab. The task group module 124, for instance, queries the tab environment module 128 for content open concurrently with the source content 202 and/or the target content 208 in the tab environment 126. Upon receiving the relevant content 302, the task group module 124 updates the task group 210 to include the relevant content 302. By including the relevant content 302 in the task group, the task group module 124 enables surfacing of the task group 210 in the tab environment 126, saving the user 118 from individually searching for each of the source content 202, the target content 208, and the relevant content 302 to resume a task in which the user was engaged when the task group 210 was created.

In one or more implementations, the task group module 124 identifies the trigger event 212 for surfacing the task group 210. For instance, the trigger event 212 is implemented as a request to launch the source content 202, the target content 208, and/or the relevant content 302 by the user 118. In some implementations, the trigger event 212 may take the form of a time-based event or a location-based event.

Responsive to receiving an indication of a trigger event, step 610 surfaces the task group for presentation in a second instance of the heterogeneous tab environment configured to display the source content, the target content, and the relevant content each in individual tabs. For example, the task group module 124 receives a request to launch the source content 202 and identifies the request as the trigger event 212. In at least some implementations, the task group module 124 surfaces the task group 210 to the tab environment module 128 to cause the tab environment 126 to be populated with the task group 210, e.g., the source content 202, the target content 208, and the relevant content. While in other implementations, more than one instance of the tab environment 126 is populated with the task group 210, e.g., the tab environment 126 is presented as two instances via the shell interfaces 404a and 404b.

Additionally or alternatively, responsive to receiving the indication of the trigger event 212, the task group module 124 may cause presentation of the visual prompt 402 to the user 118. For instance, responsive to receiving the indication of the trigger event 212, the task group module 124 may cause presentation of the visual prompt 402 configured as an interactive control displaying a selectable list of the instances of content from the task group 210. Via interaction with the visual prompt 402 the user 118 can individually select an instance of the source content 202, the target content 208, and/or the relevant content 302 to surface in the tab environment 126. Accordingly, the user 118 may control how much of the task group 210 to surface in the tab environment 126.

Figure 7:
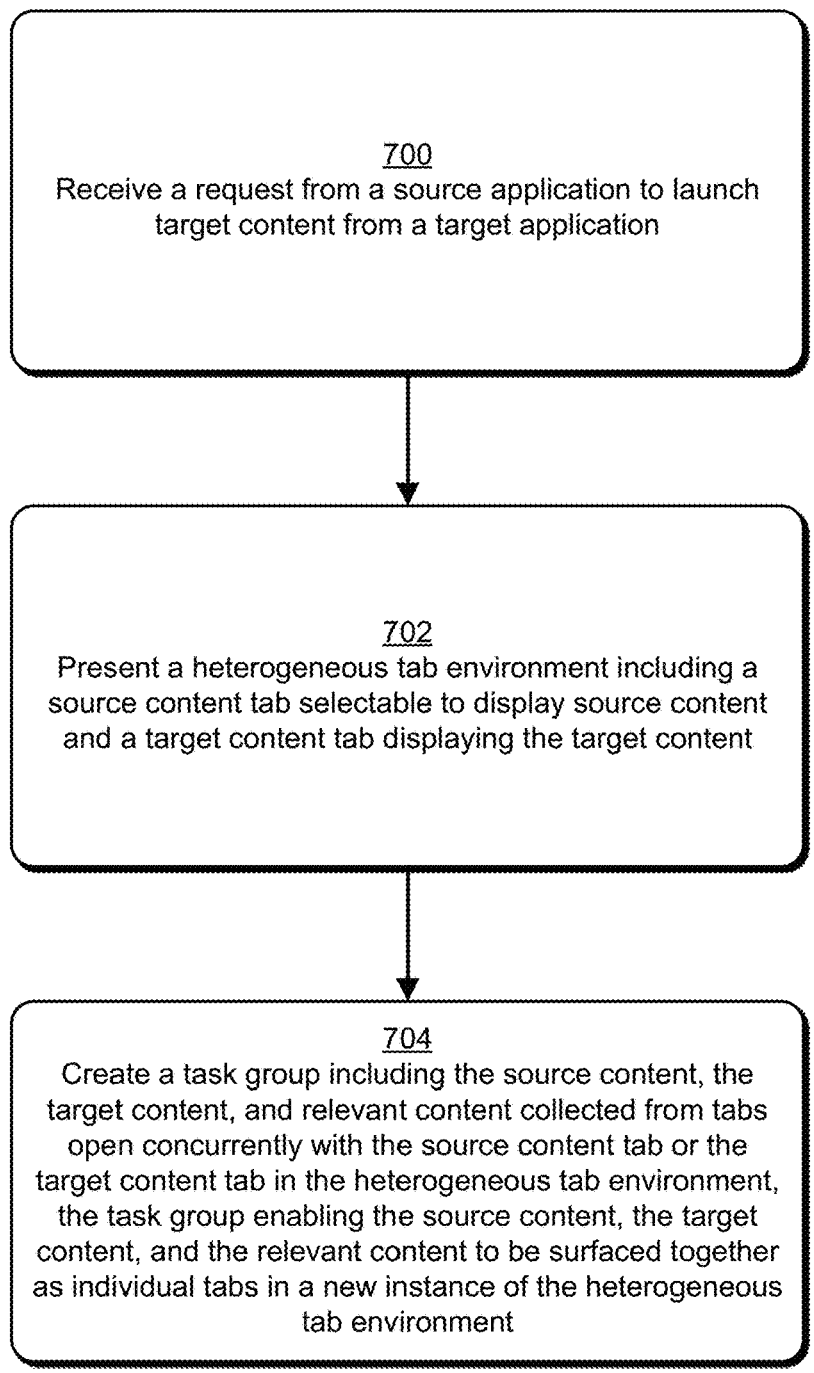
FIG. 7 is a flow diagram that describes steps in a method for creating a task group in a heterogeneous tab environment in accordance with one or more embodiments.

FIG. 7 is a flow diagram that describes steps in a method for creating a task group in a heterogeneous tab environment in accordance with one or more implementations. In at least some implementations, the method can be performed at least in part at the client device 102, e.g., by the task group module 124 and/or the tab environment module 128.

Step 700 receives a request from a source application to launch target content from a target application. The user 118, for instance, selects the visual indicator 204 configured as an access protocol (e.g., URL) from the source application 114. The request 206 to launch the target content 208 may be received by the task group module 124 in various ways as described above. For instance, the request may be received as a modified input from the input mechanisms 122 (e.g., a right-click or ctrl-click from a mouse or touch input). Additionally or alternatively, the action to initiate launching the visual indicator 204 may be configured as a file association image (e.g., icon) or a file protocol (e.g., URI or URL).

Step 702 presents a heterogeneous tab environment including a source content tab selectable to display source content and a target content tab displaying the target content. For example, the tab environment module 128 presents the tab environment 126 including the tabs 136a and 136b in the GUI 138. In at least some implementations, the tab environment 126 is presented in the shell interface of the source application 114. While in other implementations, the tab environment 126 is presented in a new shell interface.

While web browser applications are conventionally associated with a tab environment, it should be understood that the applications 112, such as the source application 114 and the target application 116 may be any type of application including but not limited to a web browser application.

Step 704 creates a task group including the source content, the target content, and relevant content collected from tabs open concurrently with the source content tab or the target content tab in the heterogeneous tab environment, the task group enabling the source content, the target content, and the relevant content to be surfaced together as individual tabs in a new instance of the heterogeneous tab environment. The task group module 124, for instance, queries the tab environment module 128 for the relevant content 302 open concurrently in the tab environment 126 with the source content 202 and/or the target content 208. By collecting the relevant content 302 and including the relevant content 302 in the task group 210, the task group module 124 enables the user 118 to surface contextually related application content when resuming a task.

Figure 8:
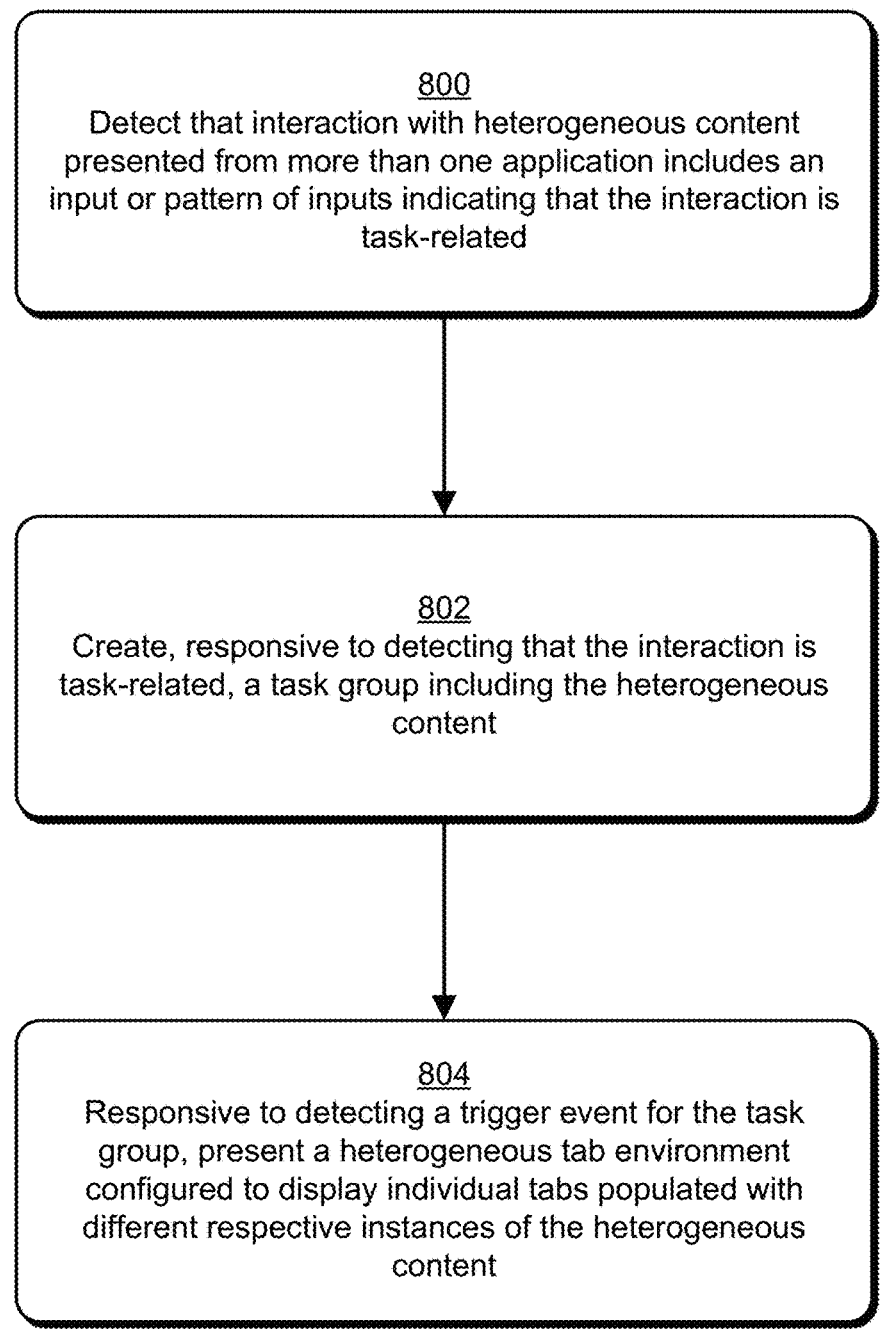
FIG. 8 is a flow diagram that describes steps in a method for creating a task group from task-relates interaction in accordance with one or more embodiments.

FIG. 8 is a flow diagram that describes steps in a method for creating a task group from task-related interaction in accordance with one or more implementations. In at least some implementations, the method can be performed at least in part at the client device 102, e.g., by the task group module 124 and/or the tab environment module 128.

Step 800 detects that interaction with heterogeneous content presented from more than one application includes an input or pattern of inputs indicating that the interaction is task-related. For instance, more than one of the applications 112 are presented in separate shell interfaces of the GUI 138. According to various implementations, the task group module 124 detects interaction with the applications 112 by the user 118 including the input 502 indicating that the interaction is task-related. The input 502 may indicate that an interaction with the source content 202 and the target content 208 is task-related when the source content 202 and the target content 208 are interacted with at a threshold frequency or in a manner that is task-related. For example, the input 502 of copying, cutting, or pasting actions between the source content 202 and target content 208 indicates task-related interaction when the interaction is detected within or for a predetermined amount of time. As another example, the input 502 consisting of moving or dragging a shell interface of an application 112 into the tab environment 126 to create a new tab may indicate task-related interaction.

Step 802 creates, responsive to detecting that the interaction is task-related, a task group including the heterogeneous content. The task group module 124, for example, creates the task group 210 to include the source content 202 and the target content 208 in response to detecting that the interaction includes the input 502 indicating task-related interaction.

Responsive to detecting a trigger event for the task group, step 804 presents a heterogeneous tab environment configured to display individual tabs populated with different respective instances of the heterogeneous content. The task group module 124, for example, presents the tab environment 126 populated with the task group 210 in the tabs 136a, 136b, and 136c. The task group module 124, by presenting the task group 210 in the tab environment 126, enables the user 118 to interact with the source content 202, the target content 208, and the relevant content 302 in a single shell interface.

Having described some example procedures, consider now an example system and device on which the various implementation scenarios and procedures may be implemented.

Figure 9:
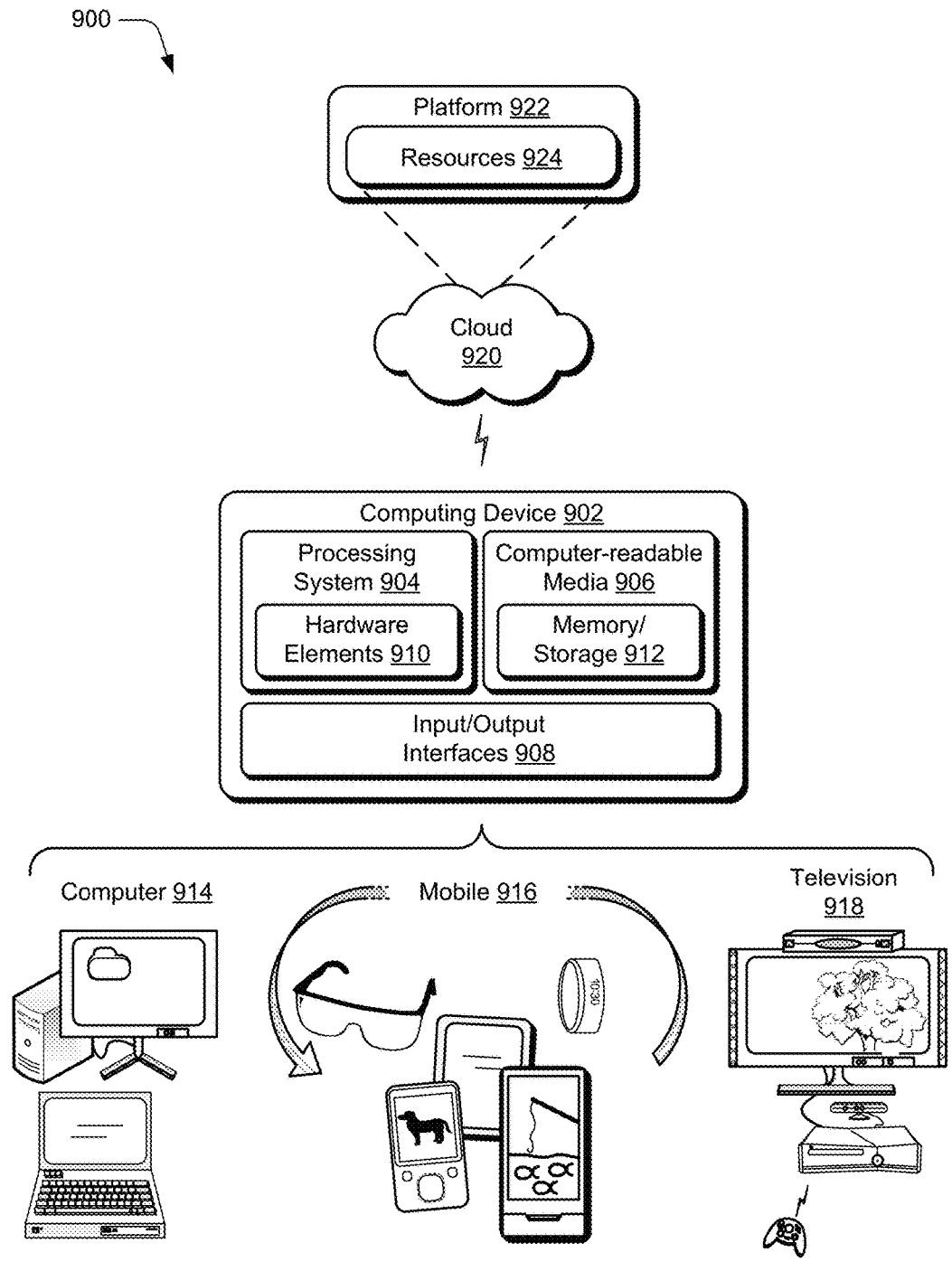
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the client device 102 discussed above with reference to FIG. 1 can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system for surfacing a task group in a tab environment, the system comprising: at least one processor; and one or more computer-readable storage media including instructions stored thereon that, responsive to execution by the at least one processor, cause the system to perform operations including: receiving a request from a source application to launch target content from a target application; presenting a first instance of a heterogeneous tab environment including a first tab populated by the source application selectable to present source content and a second tab populated by the target application presenting the target content; creating a task group including the source content and the target content; receiving an indication that one or more of the first tab or the second tab are closed; updating the task group to include relevant content from one or more tabs which were open concurrently with the first tab or the second tab; and responsive to receiving an indication of a trigger event, surfacing the task group for presentation in a second instance of the heterogeneous tab environment configured to display the source content, the target content, and the relevant content each in individual tabs.

In addition to any of the above described systems, any one or combination of: wherein said receiving the indication of the trigger event includes receiving a request to launch the source content, the target content, or the relevant content; wherein the operations further include determining the trigger event based at least in part on a date, time, location, or device contextually associated with the task group; wherein said surfacing the task group includes presenting a visual notification selectable to cause presentation of the second instance of the heterogeneous tab environment configured to display the task group; wherein said surfacing the task group includes presenting an interactive control configured to display selectable representations of each instance of the source content, the target content, and the relevant content individually for presentation in the second instance of the heterogeneous tab environment; wherein the operations further include determining the trigger event based on the target content, the source content, and the relevant content; wherein the trigger event is a time-based event; and wherein the trigger event is a location-based event.

A computer-implemented method for surfacing a task group in a tab environment, the method comprising: receiving a request from a source application to launch target content from a target application; presenting a heterogeneous tab environment including a source content tab selectable to display source content and a target content tab displaying the target content; and creating a task group including the source content, the target content, and relevant content collected from tabs open concurrently with the source content tab or the target content tab in the heterogeneous tab environment, the task group enabling the source content, the target content, and the relevant content to be surfaced together as individual tabs in a new instance of the heterogeneous tab environment.

In addition to any of the above described systems, any one or combination of: wherein the heterogeneous tab environment is presented in a shell interface of the source application; wherein said receiving the request at the source application to launch the target content comprises receiving a modified input selecting the target content, the modified input configured to launch the target content into a new shell interface or a new tab; wherein said receiving the request at the source application to launch the target content comprises receiving an input selecting a file association image or a file protocol for the target content; wherein the source application or the target application is not a web browser; and wherein the target application is not locally executable and wherein the method further comprises initiating an installation of a local instance of the target application.

A computer-implemented method for surfacing a task group in a tab environment, the method comprising: detecting that interaction with heterogeneous content presented from more than one application includes an input or pattern of inputs indicating that the interaction is task-related; creating, responsive to detecting that the interaction is task-related, a task group including the heterogeneous content; and responsive to detecting a trigger event for the task group, presenting a heterogeneous tab environment configured to display individual tabs populated with different respective instances of the heterogeneous content.

In addition to any of the above described systems, any one or combination of: wherein the input or the pattern of inputs includes copying, cutting, or pasting actions between instances of the heterogeneous content occurring more than a threshold quantity for a predetermined amount of time; wherein the input or the pattern of inputs includes switching a graphical user interface focus between instances of the heterogeneous content more than a threshold quantity for a predetermined amount of time; wherein the task group is created in response to an explicit request; further comprising presenting an interactive control displaying visual representations for each instance of the heterogeneous content and each instance of the relevant content selectable to cause said presenting the heterogeneous tab environment configured to display individual tabs populated from each selected instance; and wherein the input or pattern of inputs comprises moving or dragging an application shell interface into a tab environment as a new tab.

Techniques for surfacing a task group in a tab environment are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system to perform operations including:
   receiving a request from a source application to launch target content from a target application;
   presenting a first instance of a heterogeneous tab environment including a first tab populated by the source application selectable to present source content and a second tab populated by the target application presenting the target content;
   creating a task group including the source content and the target content;
   receiving an indication that one or more of the first tab or the second tab are closed;
   updating the task group to include relevant content from one or more tabs which were open concurrently with the first tab or the second tab; and
   responsive to receiving an indication of a trigger event, surfacing the task group for presentation in a second instance of the heterogeneous tab environment configured to display the source content, the target content, and the relevant content each in individual tabs.

2. The system described in claim 1, wherein said receiving the indication of the trigger event includes receiving a request to launch the source content, the target content, or the relevant content.

3. The system described in claim 1, wherein the operations further include determining the trigger event based at least in part on a date, time, location, or device contextually associated with the task group.

4. The system described in claim 1, wherein said surfacing the task group includes presenting a visual notification selectable to cause presentation of the second instance of the heterogeneous tab environment configured to display the task group.

5. The system described in claim 1, wherein said surfacing the task group includes presenting an interactive control configured to display selectable representations of each instance of the source content, the target content, and the relevant content individually for presentation in the second instance of the heterogeneous tab environment.

6. The system describes in claim 1, wherein the operations further include determining the trigger event based on the target content, the source content, and the relevant content.

7. The system described in claim 1, wherein the trigger event is a time-based event.

8. The system described in claim 1, wherein the trigger event is a location-based event.

9. A computer-implemented method comprising:
receiving a request from a source application to launch target content from a target application;
presenting a heterogeneous tab environment including a source content tab selectable to display source content and a target content tab displaying the target content; and
creating a task group including the source content, the target content, and relevant content collected from tabs open concurrently with the source content tab or the target content tab in the heterogeneous tab environment, the task group enabling the source content, the target content, and the relevant content to be surfaced together as individual tabs in a new instance of the heterogeneous tab environment.

10. The method described in claim 9, wherein the heterogeneous tab environment is presented in a shell interface of the source application.

11. The method described in claim 9, wherein said receiving the request at the source application to launch the target content comprises receiving a modified input selecting the target content, the modified input configured to launch the target content into a new shell interface or a new tab.

12. The method described in claim 9, wherein said receiving the request at the source application to launch the target content comprises receiving an input selecting a file association image or a file protocol for the target content.

13. The method described in claim 9, wherein the source application or the target application is not a web browser.

14. The method described in claim 9, wherein the target application is not locally executable and wherein the method further comprises initiating an installation of a local instance of the target application.

15. A system comprising:
at least one processor; and
one or more computer-readable storage media including instructions stored thereon that, responsive to execution by the at least one processor, cause the system to perform operations that comprise:
receiving a request from a source application to launch target content from a target application;
presenting a heterogeneous tab environment including a source content tab selectable to display source content and a target content tab displaying the target content; and
creating a task group including the source content, the target content, and relevant content collected from tabs open concurrently with the source content tab or the target content tab in the heterogeneous tab environment, the task group enabling the source content, the target content, and the relevant content to be surfaced together as individual tabs in a new instance of the heterogeneous tab environment.

16. The system as described in claim 15, wherein the heterogeneous tab environment is presented in a shell interface of the source application.

17. The system as described in claim 15, wherein said receiving the request at the source application to launch the target content comprises receiving a modified input selecting the target content, the modified input configured to launch the target content into a new shell interface or a new tab.

18. The system as described in claim 15, wherein said receiving the request at the source application to launch the target content comprises receiving an input selecting a file association image or a file protocol for the target content.

19. The system as described in claim 15, wherein the source application or the target application is not a web browser.

20. The system as described in claim 15, wherein the target application is not locally executable and wherein the method further comprises initiating an installation of a local instance of the target application.

* * * * *